US011028291B2

(12) United States Patent
Eveson et al.

(10) Patent No.: US 11,028,291 B2
(45) Date of Patent: Jun. 8, 2021

(54) FILM COMPRISING A STRIPPABLE SACRIFICIAL LAYER FOR REDUCTION OF SURFACE DEFECTS IN A SUBSTRATE

(71) Applicant: DuPont Teijin Films U.S. Limited Partnership, Wilmington, DE (US)

(72) Inventors: Robert Eveson, Cleveland (GB); Karl Rakos, Darlington (GB); Damian Peter Tuffin, Stockton-on-Tees (GB); Dominic Hoy, Cleveland (GB)

(73) Assignee: DUPONT TEIJIN FILMS U.S. LIMITED PARTNERSHIP, Wilmington, DE (US)

( * ) Notice: Subject to any disclaimer, the term of this patent is extended or adjusted under 35 U.S.C. 154(b) by 219 days.

(21) Appl. No.: 16/129,222

(22) Filed: Sep. 12, 2018

(65) Prior Publication Data

US 2019/0085216 A1 Mar. 21, 2019

Related U.S. Application Data

(63) Continuation of application No. 14/005,738, filed as application No. PCT/GB2012/000240 on Mar. 13, 2012, now Pat. No. 10,106,706.

(30) Foreign Application Priority Data

Mar. 17, 2011 (GB) .................................... 1104565

(51) Int. Cl.
*B32B 7/04* (2019.01)
*B32B 7/06* (2019.01)
(Continued)

(52) U.S. Cl.
CPC ................ *C09J 7/405* (2018.01); *B32B 7/06* (2013.01); *B32B 27/308* (2013.01); *B32B 27/36* (2013.01); *B32B 7/04* (2013.01); *B32B 27/08* (2013.01); *B32B 27/30* (2013.01); *B32B 37/15* (2013.01); *B32B 37/153* (2013.01); *B32B 38/10* (2013.01); *B32B 2250/02* (2013.01);
(Continued)

(58) Field of Classification Search
None
See application file for complete search history.

(56) References Cited

U.S. PATENT DOCUMENTS 3,244,708 A 4/1966 Duennenberger et al.
3,843,371 A 10/1974 Piller et al.
(Continued)

FOREIGN PATENT DOCUMENTS

EP 0006686 A2 1/1980
EP 0031202 A2 7/1981
(Continued)

OTHER PUBLICATIONS

"DuPont Surlyn Extrusion Guide" (Dec. 2003). (Year: 2003).*
(Continued)

*Primary Examiner* — Vivian Chen
(74) *Attorney, Agent, or Firm* — RatnerPrestia

(57) ABSTRACT

A coextruded biaxially oriented composite film comprising a polyester substrate layer and disposed on one or both surfaces thereof a strippable sacrificial layer, wherein said strippable sacrificial layer comprises an ethylene-methacrylic acid (EMAA) copolymer.

21 Claims, 4 Drawing Sheets

(51) Int. Cl.
   *B32B 27/08*    (2006.01)
   *B32B 27/30*    (2006.01)
   *B32B 27/36*    (2006.01)
   *B32B 37/15*    (2006.01)
   *B32B 38/10*    (2006.01)
   *C08L 33/02*    (2006.01)
   *C08F 20/04*    (2006.01)
   *C08F 20/06*    (2006.01)
   *C08F 22/02*    (2006.01)
   *G02B 1/10*     (2015.01)
   *C09J 7/40*     (2018.01)

(52) U.S. Cl.
   CPC ....... *B32B 2250/03* (2013.01); *B32B 2250/24* (2013.01); *B32B 2250/40* (2013.01); *B32B 2307/308* (2013.01); *B32B 2307/40* (2013.01); *B32B 2307/412* (2013.01); *B32B 2307/518* (2013.01); *B32B 2307/538* (2013.01); *B32B 2307/734* (2013.01); *B32B 2307/748* (2013.01); *B32B 2333/00* (2013.01); *B32B 2367/00* (2013.01); *B32B 2457/00* (2013.01); *B32B 2457/12* (2013.01); *B32B 2457/14* (2013.01); *B32B 2457/20* (2013.01); *C08F 20/04* (2013.01); *C08F 20/06* (2013.01); *C08F 22/02* (2013.01); *C08L 33/02* (2013.01); *C09K 2323/06* (2020.08); *G02B 1/10* (2013.01); *Y10T 156/1195* (2015.01); *Y10T 428/24355* (2015.01); *Y10T 428/265* (2015.01); *Y10T 428/266* (2015.01); *Y10T 428/31681* (2015.04); *Y10T 428/31786* (2015.04); *Y10T 428/31797* (2015.04)

(56) References Cited

U.S. PATENT DOCUMENTS

| | | | |
|---|---|---|---|
| 4,351,754 A | | 9/1982 | Dupré |
| 4,446,262 A | | 5/1984 | Okumura et al. |
| 4,540,623 A | | 9/1985 | Im et al. |
| 4,617,207 A | * | 10/1986 | Ueki ........................ B29C 48/18 428/1.31 |
| 4,619,956 A | | 10/1986 | Susi |
| 4,681,905 A | | 7/1987 | Kubota et al. |
| 4,684,679 A | | 8/1987 | Kubota et al. |
| 4,812,498 A | | 3/1989 | Nakahara et al. |
| 4,888,391 A | | 12/1989 | Domine et al. |
| 5,245,456 A | | 9/1993 | Yoshimi et al. |
| 5,251,064 A | | 10/1993 | Tennant et al. |
| 5,264,539 A | | 11/1993 | Shepherd |
| 5,269,995 A | | 12/1993 | Ramanathan et al. |
| 5,288,778 A | | 2/1994 | Schmitter et al. |
| 5,554,698 A | | 9/1996 | Wang et al. |
| 5,759,467 A | | 6/1998 | Carter et al. |
| 5,783,120 A | * | 7/1998 | Ouderkirk ................ G02B 1/04 264/1.34 |
| 5,825,543 A | * | 10/1998 | Ouderkirk ............ G02B 5/3083 359/487.02 |
| 5,831,375 A | | 11/1998 | Benson, Jr. |
| 5,882,774 A | | 3/1999 | Jonza et al. |
| 6,198,217 B1 | | 3/2001 | Suzuki et al. |
| 6,673,425 B1 | | 1/2004 | Hebrink et al. |
| 6,737,154 B2 | | 5/2004 | Jonza et al. |
| 7,396,632 B2 | | 7/2008 | Wolk et al. |
| 8,182,924 B2 | | 5/2012 | Hebrink et al. |
| 10,106,706 B2 | * | 10/2018 | Eveson ...................... B32B 7/06 |
| 2004/0040652 A1 | * | 3/2004 | Bharti ...................... G09F 7/12 156/273.1 |
| 2004/0043221 A1 | * | 3/2004 | Bharti .................... H01G 7/021 428/409 |
| 2004/0176541 A1 | | 9/2004 | Jackson et al. |
| 2006/0029784 A1 | | 2/2006 | Doan et al. |
| 2006/0066285 A1 | | 3/2006 | Moriya |
| 2006/0227421 A1 | | 10/2006 | Stover et al. |
| 2006/0228092 A1 | | 10/2006 | Hebrink et al. |
| 2006/0272766 A1 | | 12/2006 | Hebrink et al. |
| 2007/0014020 A1 | | 1/2007 | Bourdelais et al. |
| 2007/0054131 A1 | | 3/2007 | Stewart |
| 2008/0103258 A1 | | 5/2008 | McGee et al. |
| 2008/0145581 A1 | | 6/2008 | Tanny |
| 2008/0252827 A1 | | 10/2008 | Hirai et al. |
| 2009/0068401 A1 | | 3/2009 | Sato et al. |
| 2010/0092793 A1 | | 4/2010 | Aithani et al. |

FOREIGN PATENT DOCUMENTS

| | | |
|---|---|---|
| EP | 0031203 A2 | 7/1981 |
| EP | 0076582 A1 | 4/1983 |
| EP | 0345884 A2 | 12/1989 |
| EP | 0663867 A1 | 7/1995 |
| JP | 2000006291 A | 1/2000 |
| JP | 2001215302 A | 8/2001 |
| JP | 2003080637 A | 3/2003 |
| JP | 2009227790 A | 10/2009 |
| WO | 9405645 A1 | 3/1994 |
| WO | 9407677 A1 | 4/1994 |
| WO | 9615903 A1 | 5/1996 |
| WO | 03087247 A1 | 10/2003 |
| WO | 2007012805 A1 | 2/2007 |
| WO | 2009105427 A2 | 8/2009 |

OTHER PUBLICATIONS

European Examination Report for European Application No. 12 712 139.0, dated Oct. 5, 2017—5 pages.
"Film Coextrusion: A Troubleshooting Guide", Lyondellbasel, Nov. 1994—20 pages.
Hitchcock et al., "The Dual-capillary Method for Modern-day Viscometry", American Laboratory, 1994—7 pages.
International Search Report for International Application No. PCT/GB2012/000240, dated May 31, 2012—4 pages.
Great Britain Search Report for Application No. GB1104565.5, dated Oct. 31, 2011—4 pages.
Written Opinion for Application No. PCT/GB2012/000240, dated Apr. 2, 2013—5 pages.

* cited by examiner

FILM COMPRISING A STRIPPABLE SACRIFICIAL LAYER FOR REDUCTION OF SURFACE DEFECTS IN A SUBSTRATE

This application is a continuation of U.S. patent application Ser. No. 14/005,738, U.S. Pat. No. 10,106,706, filed Sep. 17, 2013, which is a National Stage filing of International Application No. PCT/GB2012/000240, filed Mar. 13, 2012, and claims priority of GB Application No. 1104565.5, filed Mar. 17, 2011, the disclosures of each of these applications are incorporated herein by reference in their entireties for all purposes.

FIELD OF THE INVENTION

The present invention is concerned with a polyester film (particularly a polyethylene terephthalate (PET) film) having a strippable sacrificial protective layer, and with a process for the production thereof.

BACKGROUND OF THE INVENTION

The advantageous mechanical properties, dimensional stability and optical properties of biaxially oriented polyester films are well-known. These properties have led to the use of polyester films in electronic and opto-electronic devices including electroluminescent (EL) display devices (particularly organic light emitting display (OLED) devices), electrophoretic displays (e-paper), photovoltaic cells and semiconductor devices (such as organic field effect transistors, thin film transistors and integrated circuits generally). For these and other applications, it is sometimes necessary to provide a very smooth and flat surface for the further processing of the polyester film, for instance to ensure the integrity of subsequently applied coatings, such as a conductive coating or a barrier coating, in order to avoid breaks or pin-pricks therein. In the manufacture of flexible electronic or opto-electronic display devices, for instance, a conductive layer such as indium tin oxide (ITO) may be disposed on a film substrate via a sputtering technique, and non-uniformity in the substrate surface can cause non-uniformity and % or discontinuities in the conductive layer, resulting in for example non-uniform conductivity or pixel yield problems, depending on the type of electronic device.

It is known to reduce defects in layers subsequently applied to a substrate by the provision of an intermediate planarising layer, as taught in WO-03/087247-A for instance. An alternative approach is to provide strippable sacrificial protective layers which are easily peelable from a substrate surface, in order to protect that surface from damage, contamination and/or debris during storage or transport. The sacrificial layers are then stripped from the substrate to leave a clean surface immediately prior to the further processing or installation of the substrate. For instance, WO-2009/105427-A discloses a composite optical compensation film comprising a polyolefin substrate and strippable layers comprising from a variety of polymeric materials including other polyolefins, polyesters, and ionomers. EP-0345884-A discloses a coextruded strippable polyolefin or polyamide film on the surface of a polycarbonate sheet to avoid loss of a volatile UV stabiliser in the polycarbonate, to protect the production equipment from exuded amounts of the stabiliser, and to protect the polycarbonate surface during handling and shipping. EP-0663867-A teaches the provision of strippable sacrificial layers to a multilayer polymeric body by coating and lamination techniques. Other disclosures of strippable skin layers include U.S. Pat. Nos. 4,540,623 and 7,396,632. The prior art, however, is primarily focussed on the need to protect a substrate surface from extrinsic debris or physical damage during storage or transport.

It would be desirable to provide a polyester film wherein one or both surfaces thereof exhibit minimal or no surface defects (low intrinsic process defects), and high surface cleanliness (i.e. low extrinsic debris).

SUMMARY OF THE INVENTION

According to the present invention, there is provided a coextruded biaxially oriented composite film comprising a polyester substrate layer and disposed on one or both surfaces thereof a strippable sacrificial layer, wherein said strippable sacrificial layer comprises an ethylene-methacrylic acid (EMAA) copolymer, and wherein the polyester is derived from: (i) one or more diol(s); (ii) one or more aromatic dicarboxylic acid(s); and (iii) optionally, one or more aliphatic dicarboxylic acid(s) of formula $C_nH_{2n}(COOH)_2$ wherein n is 2 to 8, wherein said aromatic dicarboxylic acid(s) is/are present in the polyester in an amount of from about 80 to about 100) mole % based on the total amount of dicarboxylic acid components in the polyester.

DETAILED DESCRIPTION OF THE INVENTION

Figure 1A:
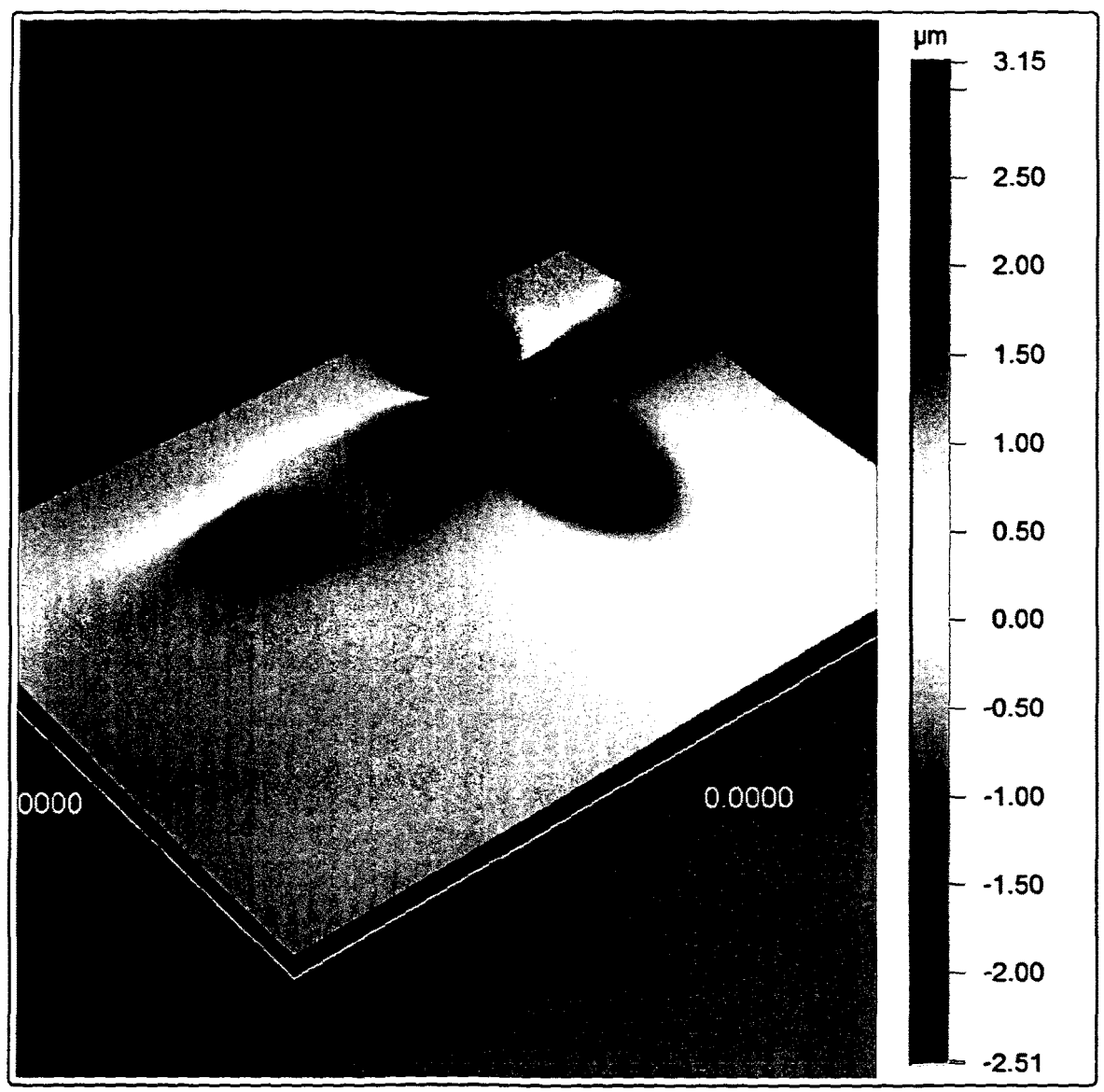
FIG. 1A is a large-area metrology (LAM) image showing a pinch-point defect in a polyester substrate.

The cleanliness and smoothness of the substrate surface after removal of the strippable sacrificial layer can be described in terms of "extrinsic" and "intrinsic" roughness. As used herein, the term "extrinsic" roughness refers to roughness resulting from air-borne debris and/or handling damage which the substrate may suffer during storage and/or transport. As used herein, the term "intrinsic" roughness refers to roughness which is present in the substrate itself or is a result of the process history of the film. The intrinsic roughness of the substrate includes any roughness induced by the presence of the strippable sacrificial layer or its removal.

The composite film according to the invention exhibits the following advantages:
  (i) The film is manufactured by coextrusion and hence its production process is more economic and efficient than a two-step process in which the sacrificial layer is applied to a finished substrate. Thus, the strippable sacrificial layer is not only peelable from the polyester substrate but it is also co-extrudable with the polyester substrate.
  (ii) The strippable sacrificial layer is reliably extrudable and processible under the conditions conventionally used to manufacture biaxially oriented polyester films, and is extrudable with a uniform thickness and without MD lines. The composite film thereby exhibits good windability and allows the formation of a uniform roll of film, which can be a problem with some conventional strippable sacrificial layers.

(iii) The strippable sacrificial layer is easily peelable from the polyester substrate, but the interfacial adhesive strength is not so low that it spontaneously peels apart from the substrate during manufacture, during storage or during transport of the composite film, which can be a problem with some conventional strippable sacrificial layers. Furthermore, while modulation of interfacial adhesion between the substrate and strippable layers has conventionally been possible by using an intermediate tie-layer therebetween, it is an advantage of this invention that there is no need for intermediate tie-layer, which provides economy and process efficiency in the manufacturing process.

(iv) The strippable sacrificial layer is easily peelable from the polyester substrate, especially in a roll-to-roll process, without leaving remnants or residue of itself on the surface of the polyester substrate or otherwise disrupting the surface of the polyester substrate when peeled, which can be a problem with some conventional strippable sacrificial layers. Thus, the strippable sacrificial layer of the present invention exhibits an easy and clean peel.

(v) The strippable sacrificial layer performs the required function of protecting the polyester substrate from damage or extrinsic debris during storage or transport until it is ready to be used or further processed. However, the strippable sacrificial layer must retain, or at least not significantly degrade, the intrinsic surface smoothness of the underlying polyester substrate, as well as other properties (such as haze) of the substrate. A problem with many strippable sacrificial layers is that they impart significant additional texture or roughness or other defect to the surface of the underlying substrate which would not have been present in the absence of the strippable layer. For example, while the present inventors do not intend to be bound by theory, it is believed that the presence of gels or other particulates in the polymer matrix of strippable sacrificial layers can induce depressions in the underlying substrate layer which remain after removal of the sacrificial layer. The preferred strippable sacrificial layers of the present invention reduce such problems.

(vi) Moreover, the preferred strippable layers of the present invention can advantageously reduce the intrinsic surface defects of the film. Thus, the presence of the strippable layer during processing can improve the surface smoothness of the polyester substrate, when compared to the same polyester substrate manufactured under the same conditions in the absence of the strippable layer. Such surface defects are discussed in more detail below and include, for instance, scratches, pinch-point defects, smooth circular defects, gels, streaks, flow-lines, MD-lines, die-lines and handling marks (for instance as a result of surface imperfections in the rollers on the film line) which can arise during manufacture of the film. Pinch-point defects are a primary source of disruption to a subsequently applied layer, and their reduction is a particular objective of this invention. They have a much greater disruptive effect to subsequently applied layers than, for example, the smooth circular defects.

It is very surprising that the biaxially oriented polyester base layer and EMAA strippable layer of the present invention exhibit this combination of properties.

The biaxially oriented composite film is a self-supporting film or sheet by which is meant a film or sheet capable of independent existence in the absence of a supporting base. According to the present invention, both the polyester substrate and the strippable layer are also self-supporting.

The term "polyester" as used herein includes a polyester homopolymer in its simplest form or modified, chemically and/or physically. The term "polyester" further includes copolyesters. A copolyester may be a random, alternating or block copolyester. In a preferred embodiment, the dicarboxylic acid(s) which make up said polyester are aromatic dicarboxylic acid(s). In a preferred embodiment, the polyester comprises only one diol and only one dicarboxylic acid, which is preferably an aromatic dicarboxylic acid.

The aromatic dicarboxylic acid is preferably selected from terephthalic acid, isophathalic acid, phthalic acid, 1,4-, 2,5-, 2,6- or 2,7-naphthalenedicarboxylic acid, and is preferably terephthalic acid or 2,6-naphthalenedicarboxylic acid, preferably 2,6-naphthalenedicarboxylic acid. The diol is preferably selected from aliphatic and cycloaliphatic glycols, e.g. ethylene glycol, 1,3-propanediol, 1,4-butanediol, neopentyl glycol and 1,4-cyclohexanedimethanol, preferably from aliphatic glycols. Preferably the polyester contains only one glycol, preferably ethylene glycol. The aliphatic dicarboxylic acid may be succinic acid, glutaric acid, adipic acid, pimelic acid, suberic acid azeleic acid or sebacic acid. Preferred homopolyesters are polyesters of 2,6-naphthalenedicarboxylic acid or terephthalic acid with ethylene glycol. It will be appreciated by those skilled in the art that polyesters suitable for use in the present invention are water-insoluble.

The polyester resin is the major component of the substrate, and makes up at least 50%, preferably at least 65%, preferably at least 80%, preferably at least 90%, and preferably at least 95% by weight of the total weight of the substrate.

The intrinsic viscosity (IV) of the polyester from which the substrate is manufactured is typically at least about 0.58, more typically at least about 0.60, and typically no more than about 0.70. In a preferred embodiment, a PET polyester has an IV in the range of from about 0.6 to about 0.65, and a PEN polyester has an IV in the range of from about 0.58 to about 0.68. In an alternative embodiment, the substrate can be manufactured from a polyester with a higher intrinsic viscosity, for instance, having an IV of at least about 0.70, and in a further embodiment at least about 0.80, and typically no more than 0.90.

The polyester is obtainable from said dicarboxylic acid(s) or their lower alkyl (up to 6 carbon atoms) diesters with one or more diols. Formation of the polyester is conveniently effected in a known manner by condensation or ester interchange, generally at temperatures up to about 295° C. In one embodiment, solid state polymerisation may be used to increase the intrinsic viscosity to the desired value, using conventional techniques well-known in the art, for instance using a fluidised bed such as a nitrogen fluidised bed or a vacuum fluidised bed using a rotary vacuum drier.

In one embodiment, the substrate may further comprise a UV-absorber. The UV-absorber has an extinction coefficient much higher than that of the polyester such that most of the incident UV light is absorbed by the UV-absorber rather than by the polyester. The UV-absorber generally dissipates the absorbed energy as heat, thereby avoiding degradation of the polymer chain, and improving the stability of the polyester to UV light. Typically, the UV-absorber is an organic UV-absorber, and suitable examples include those disclosed in Encyclopaedia of Chemical Technology, Kirk-Othmer, Third Edition, John Wiley & Sons, Volume 23, Pages 615 to 627. Particular examples of UV-absorbers include benzophenones, benzotriazoles (U.S. Pat. Nos. 4,684,679, 4,812,498 and 4,681,905), benzoxazinones (U.S. Pat. Nos. 4,446,262, 5,251,064 and 5,264,539) and triazines (U.S. Pat. Nos. 3,244,708, 3,843,371, 4,619,956, 5,288,778 and WO 94/05645). The UV-absorber may be incorporated into the film according to one of the methods described herein. In one embodiment, the UV-absorber may be chemically incorporated in the polyester chain. EP-A-0006686, EP-A-0031202, EP-A-031203 and EP-A-0076582, for example, describe the incorporation of a benzophenone into the polyester. The specific teaching of the aforementioned documents regarding UV-absorbers is incorporated herein by reference. In a particularly preferred embodiment, improved UV-stability in the present invention is provided by triazines, more preferably hydroxyphenyltriazines, and particularly hydroxyphenyltriazine compounds of formula (II):

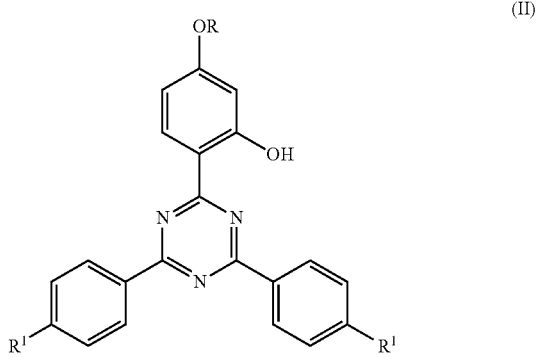

(II)

wherein R is hydrogen, $C_1$-$C_{18}$ alkyl, $C_2$-$C_6$ alkyl substituted by halogen or by $C_1$-$C_{12}$ alkoxy, or is benzyl and $R^1$ is hydrogen or methyl. R is preferably $C_1$-$C_{12}$ alkyl or benzyl, more preferably $C_3$-$C_6$ alkyl, and particularly hexyl. $R^1$ is preferably hydrogen. An especially preferred UV-absorber is 2-(4,6-diphenyl-1,3,5-triazin-2-yl)-5-(hexyl)oxy-phenol, which is commercially available as Tinuvin™ 1577 FF from Ciba-Additives.

The amount of UV-absorber is preferably in the range from 0.1% to 10%, more preferably 0.2% to 7%, more preferably 0.6% to 4%, particularly 0.8% to 2%, and especially 0.9% to 1.2% by weight, relative to the total weight of the substrate.

The substrate may also comprise an anti-oxidant, which may be present in addition to, or instead of, said UV-stabiliser. A range of antioxidants may be used, such as antioxidants which work by trapping radicals or by decomposing peroxide. Suitable radical-trapping antioxidants include hindered phenols, secondary aromatic amines and hindered amines, such as Tinuvin™ 770 (Ciba-Geigy). Suitable peroxide-decomposing antioxidants include trivalent phosphorous compounds, such as phosphonites, phosphites (e.g. triphenyl phosphate and trialkylphosphites) and thiosynergists (e.g. esters of thiodipropionic acid, such as dilauryl thiodipropionate). Hindered phenol antioxidants are preferred. A preferred hindered phenol is tetrakis-(methylene 3-(4'-hydroxy-3', 5'-di-t-butylphenyl propionate) methane, which is commercially available as Irganox™ 1010 (Ciba-Geigy). Other suitable commercially available hindered phenols include Irganox™ 1035, 1076, 1098 and 1330 (Ciba-Geigy), Santanox™ R (Monsanto), Cyanox™ antioxidants (American Cyanamid) and Goodrite™ antioxidants (BF Goodrich). The concentration of antioxidant present in the substrate is preferably in the range from 50 ppm to 5000 ppm of the polyester, more preferably in the range from 300 ppm to 1500 ppm, particularly in the range from 400 ppm to 1200 ppm, and especially in the range from 450 ppm to 600 ppm. A mixture of more than one antioxidant may be used, in which case the total concentration thereof is preferably within the aforementioned ranges. Incorporation of the antioxidant into the substrate may be effected by conventional techniques, and preferably by mixing with the monomeric reactants from which the polyester is derived, particularly at the end of the direct esterification or ester exchange reaction, prior to polycondensation.

The polyester substrate may further comprise any other additive conventionally employed in the manufacture of polyester films. Thus, agents such as cross-linking agents, dyes, fillers, pigments, voiding agents, lubricants, radical scavengers, thermal stabilisers, flame retardants and inhibitors, anti-blocking agents, surface active agents, slip aids, gloss improvers, prodegradents, viscosity modifiers and dispersion stabilisers may be incorporated as appropriate. Such components may be introduced into the polymer in a conventional manner. For example, by mixing with the monomeric reactants from which the film-forming polymer is derived, or the components may be mixed with the polymer by tumble or dry blending or by compounding in an extruder, followed by cooling and, usually, comminution into granules or chips. Masterbatching technology may also be employed.

The substrate may, in particular, comprise a particulate filler which can improve handling and windability during manufacture, and can be used to modulate optical properties. The particulate filler may, for example, be a particulate inorganic filler (e.g. metal or metalloid oxides, such as alumina, titania, talc and silica (especially precipitated or diatomaceous silica and silica gels), calcined china clay and alkaline metal salts, such as the carbonates and sulphates of calcium and barium). Any inorganic filler present should be finely-divided, and the volume distributed median particle diameter (equivalent spherical diameter corresponding to 50% of the volume of all the particles, read on the cumulative distribution curve relating volume % to the diameter of the particles—often referred to as the "D(v,0.5)" value) thereof is preferably in the range from 0.01 to 5 µm, more preferably 0.05 to 1.5 µm, and particularly 0.15 to 1.2 µm. Preferably at least 90%, more preferably at least 95% by volume of the inorganic filler particles are within the range of the volume distributed median particle diameter±0.8 µm, and particularly ±0.5 µm. Particle size of the filler particles may be measured by electron microscope, coulter counter, sedimentation analysis and static or dynamic light scattering. Techniques based on laser light diffraction are preferred.

Typically, the polyester substrate is optically clear, since the majority of end-uses of the substrate demand good aesthetic appearance. Preferably the substrate has a % of scattered visible light (haze) of no more than 15%, preferably no more than 10%, preferably no more than 6%, more preferably no more than 3.5%, more preferably no more than 1.5%, and particularly no more than 1.0%, and/or a total luminous transmission (TLT) for light in the visible region (400 nm to 700 nm) of at least 80%, preferably at least 85%, more preferably at least about 90%. In this embodiment, any filler in the substrate is typically present in only small amounts, generally not exceeding 0.5% and preferably less than 0.2% by weight of a layer, and the filler is preferably silica. In this embodiment, the windability of the film (i.e. the absence of blocking or sticking when the film is wound up into a roll) is improved, without an unacceptable reduction in haze or other optical properties.

In an alternative embodiment, the substrate is opaque. An opaque film preferably exhibits a Transmission Optical Density (TOD) of at least 0.4, preferably at least 0.5, preferably at least 0.6, preferably at least 0.7, preferably at least 1.0 and preferably at least 1.5, and in one embodiment preferably at least 2.0, preferably at least 3.0, and preferably at least 4.0. An opaque film may be pigmented as required, and in one embodiment, the substrate is white, grey or black. Suitable whitening agents include a particulate inorganic filler such as those referred to hereinabove, an incompatible resin filler, or a mixture of two or more such fillers. Suitable opacifying agents include carbon black, or a metallic filler such as aluminium powder, as is known in the art.

The intrinsic viscosity of the polyester substrate is typically lower than that of the polyester from which it is manufactured, and the IV drop during the preparation of a biaxially oriented polyester film from a polyester raw material can be as much as 0.15, particularly for polyesters having a relatively high initial IV. Typically, however, the IV drop is less than about 0.06. In one embodiment, the IV of the polyester substrate is at least about 0.52, preferably at least about 0.60 and typically no more than about 0.70. Typically, a PET substrate has an IV in the range of from about 0.57 to about 0.65, and preferably at least about 0.60. A PEN substrate has an IV in the range of from about 0.52 to about 0.68, and preferably at least about 0.60. In an alternative embodiment, the polyester substrate has a higher intrinsic viscosity, for instance, having an IV of at least about 0.70, preferably at least about 0.75, and typically no more than about 0.80.

The polyester substrate preferably exhibits a low shrinkage, preferably no more than 3% at 150° C. over 30 minutes, preferably no more than 2%, preferably no more than 1.5%, and preferably no more than 1.0%, particularly in the machine (longitudinal dimension) of the film, and preferably in both dimensions of the substrate (i.e. the longitudinal and transverse dimensions). The substrate should not undergo unacceptable dimensional distortion, such as curl, when subjected to subsequent processing conditions, for instance processing involving elevated temperature (such as sputtering to deposit a subsequent layer), which may be used for instance in the manufacture of electronic display devices.

The strippable layer comprises (and suitably consists, or consists essentially, of) an ethylene-methacrylic acid (EMAA) copolymer. In a preferred embodiment, the methacrylic acid is present in the copolymer in the range of from about 2 to about 15 wt % of the copolymer, more preferably in the range of from about 2 to about 10 wt %, and preferably in the range of from about 7 to about 10 wt %. In an alternative embodiment, the methacrylic acid is present in the copolymer in the range of from about 2 to less than about 7 wt %. The copolymers are preferably branched and preferably random. Suitable EMAA copolymers include Nucrel® resins (DuPont), particularly Nucrel® grades 0411HS and 0908HS. Optionally, the copolymer has been partially or completely reacted with metallic salts, enabling the formation of ionic cross-links between the acid groups within a chain, or between neighbouring chains. Such copolymers are known as ionomers, defined herein as a polymer made up primarily of non-polar repeat units with a minor proportion (typically no more than about 15 wt %) of metal salt-containing units of methacrylic acid. Preferred ionomers are the copolymers of ethylene and methacrylic acid partially or completely neutralised with alkali metals or zinc. Suitable commercially available compounds include Surlyn® resins (DuPont), particularly grades 1605 and 1652. The metal cation is typically selected from alkali metals such as lithium and sodium. Zinc or magnesium may also be used. Typically, the metal cation is present at no more than about 15 mol %. Preferably, the EMAA copolymer is not an ionomer and does not contain metal ions.

In a preferred embodiment, the melting temperature of the EMAA copolymer is at least about 90° C., and preferably no more than about 250° C., preferably no more than about 200° C., preferably no more than about 150° C., more preferably no more than about 120° C. In a further preferred embodiment, the VICAT softening point of the EMAA copolymer is at least about 60° C., and typically in the range from about 60° C. to about 110° C., more typically in the range from about 70° C. to about 100° C.

Formation of the composite film is effected by conventional co-extrusion techniques well-known in the art. In general terms the process comprises the steps of extruding layers of molten polymer at a temperature within the range of from about 280 to about 300° C., quenching the extrudate and orienting the quenched extrudate. Orientation may be effected by any process known in the art for producing an oriented film, for example a tubular or flat film process. Biaxial orientation is effected by drawing in two mutually perpendicular directions in the plane of the film to achieve a satisfactory combination of mechanical and physical properties. In a tubular process, simultaneous biaxial orientation may be effected by extruding a thermoplastics polymer tube which is subsequently quenched, reheated and then expanded by internal gas pressure to induce transverse orientation, and withdrawn at a rate which will induce longitudinal orientation. In the preferred flat film process, the film-forming polymer is extruded through a slot die and rapidly quenched upon a chilled casting drum to ensure that the substrate polyester is quenched to the amorphous state. Orientation is then effected by stretching the quenched extrudate in at least one direction at a temperature above the glass transition temperature of the substrate polyester. Sequential orientation may be effected by stretching a flat, quenched extrudate firstly in one direction, usually the longitudinal direction, i.e. the forward direction through the film stretching machine, and then in the transverse direction. Forward stretching of the extrudate is conveniently effected over a set of rotating rolls or between two pairs of nip rolls, transverse stretching then being effected in a stenter apparatus. Stretching is generally effected so that the dimension of the oriented film is from 2 to 5, more preferably 2.5 to 4.5 times its original dimension in the or each direction of stretching. Typically, stretching is effected at temperatures higher than the $T_g$ of the polyester, preferably about 15° C. higher than the Ts. Greater draw ratios (for example, up to about 8 times) may be used if orientation in only one direction is required. It is not necessary to stretch equally in the machine and transverse directions although this is preferred if balanced properties are desired.

A stretched film may be, and preferably is, dimensionally stabilised by heat-setting under dimensional support at a temperature above the glass transition temperature of the substrate polyester but below the melting temperature thereof, to induce the desired crystallisation of the polyester. During the heat-setting, a small amount of dimensional relaxation may be performed in the transverse direction (TD) by a procedure known as "toe-in". Toe-in can involve dimensional shrinkage of the order 2 to 4% but an analogous dimensional relaxation in the process or machine direction (MD) is difficult to achieve since low line tensions are required and film control and winding becomes problematic. The actual heat-set temperature and time will vary depending on the composition of the film and its desired final thermal shrinkage but should not be selected so as to substantially degrade the toughness properties of the film such as tear resistance. Within these constraints, a heat set temperature of about 180 to 245° C. is generally desirable. After heat-setting the film is typically quenched rapidly in order induce the desired crystallinity of the substrate polyester.

In one embodiment, the film may be further stabilized through use of an on-line relaxation stage. Alternatively the relaxation treatment can be performed off-line. In this additional step, the film is heated at a temperature lower than that of the heat-setting stage, and with a much reduced MD and TD tension. The tension experienced by the film is a low tension and typically less than 5 kg/m, preferably less than 3.5 kg/m, more preferably in the range of from 1 to about 2.5 kg/m, and typically in the range of 1.5 to 2 kg/m of film width. For a relaxation process which controls the film speed, the reduction in film speed (and therefore the strain relaxation) is typically in the range 0 to 2.5%, preferably 0.5 to 2.0%. There is no increase in the transverse dimension of the film during the heat-stabilisation step. The temperature to be used for the heat stabilisation step can vary depending on the desired combination of properties from the final film, with a higher temperature giving better, i.e. lower, residual shrinkage properties. A temperature of 135 to 250° C. is generally desirable, preferably 150 to 230° C., more preferably 170 to 200° C. The duration of heating will depend on the temperature used but is typically in the range of 10 to 40 seconds, with a duration of 20 to 30 seconds being preferred. This heat stabilisation process can be carried out by a variety of methods, including flat and vertical configurations and either "off-line" as a separate process step or "in-line" as a continuation of the film manufacturing process. Film thus processed will exhibit a smaller thermal shrinkage than that produced in the absence of such post heat-setting relaxation.

Co-extrusion is effected either by simultaneous coextrusion of the respective film-forming layers through independent orifices of a multi-orifice die, and thereafter uniting the still molten layers or, preferably, by single-channel coextrusion in which molten streams of the respective polymers are first united within a channel leading to a die manifold, and thereafter extruded together from the die orifice under conditions of streamline flow without intermixing thereby to produce a multi-layer film, which is oriented and heat-set as hereinbefore described. It will therefore be appreciated by those skilled in the art that the strippable sacrificial layer is disposed directly on one or both surface(s) of said polyester substrate, i.e. without any intermediate layer.

The thickness of the composite film is preferably in the range of from about 5 to about 750 µm, and more preferably no more than about 500 µm, and typically between about 12 µm and 250 µm. The thickness of the substrate layer is preferably in the range of from about 5 to about 500 µm, and typically between about 12 µm and 300 µm. The thickness of the strippable layer is preferably in the range of from about 2 to about 200 µm, and typically no more than about 100 µm, and typically between about 5 µm and 50 µm, and in preferred embodiment between about 5 and 25 µm. It is preferred that the substrate layer makes up greater than 50%, preferably at least 60%, preferably at least 70%, and preferably at least 80% of the total thickness of the composite film, but typically no more than about 95% of the total thickness. In one embodiment, the substrate layer makes up from about 75 to about 95% of the total thickness of the composite film. The strippable layer typically ends up as waste film and becomes uneconomical if it is too thick, but the strippable layer must have a sufficient thickness and mechanical strength to allow an easy and clean peel.

The adhesive strength of the strippable sacrificial layer to the polyester substrate is such that the peel force is preferably in the range of from about 5 to about 250 gF (grams-Force), preferably at least about 10 gF, preferably at least about 20 gF, preferably at least about 35 gF, typically at least about 50 gF, and typically no more than about 200 gF, measured as described herein.

In the present invention, the intrinsic surface roughness of the polyester substrate after removal of the strippable layer is primarily analysed by two methods.

The first method analyses the intrinsic "micro-roughness", i.e. the background surface roughness between major surface defects, measured as described herein and preferably characterised by the conventional parameters of Ra and/or Rq. Preferably, the polyester substrate exhibits an Ra value, of less than 10 nm, preferably less than 7 nm, preferably less than 5 nm, preferably less than 2 nm, and preferably less than 1 nm.

The second method analyses the intrinsic "macro-roughness" using large-area metrology (LAM) which analyses the major intrinsic surface defects. The major intrinsic surface defects in the polyester substrate can be categorised as defects (1) to (3) as follows:

(1) Defects caused by inclusions within the polyester substrate, which can be caused by the presence of, for instance, fillers, crystallites, degradants and gels (typically regions of intractable polymer (for instance, cross-linked, branched or degraded polymer) having a molecular weight or rheology different to the bulk polymer matrix), and which can be categorised as "pinch-point" defects and "smooth circular" defects:

(a) Pinch-point defects are characterised by a crater either side of a central peak (see FIG. 1A). It is believed that such defects are caused by inclusions which reside relatively near the surface of the substrate, which generate greater localised stress/strain regions during the stretching steps of film manufacture.

Figure 1B:
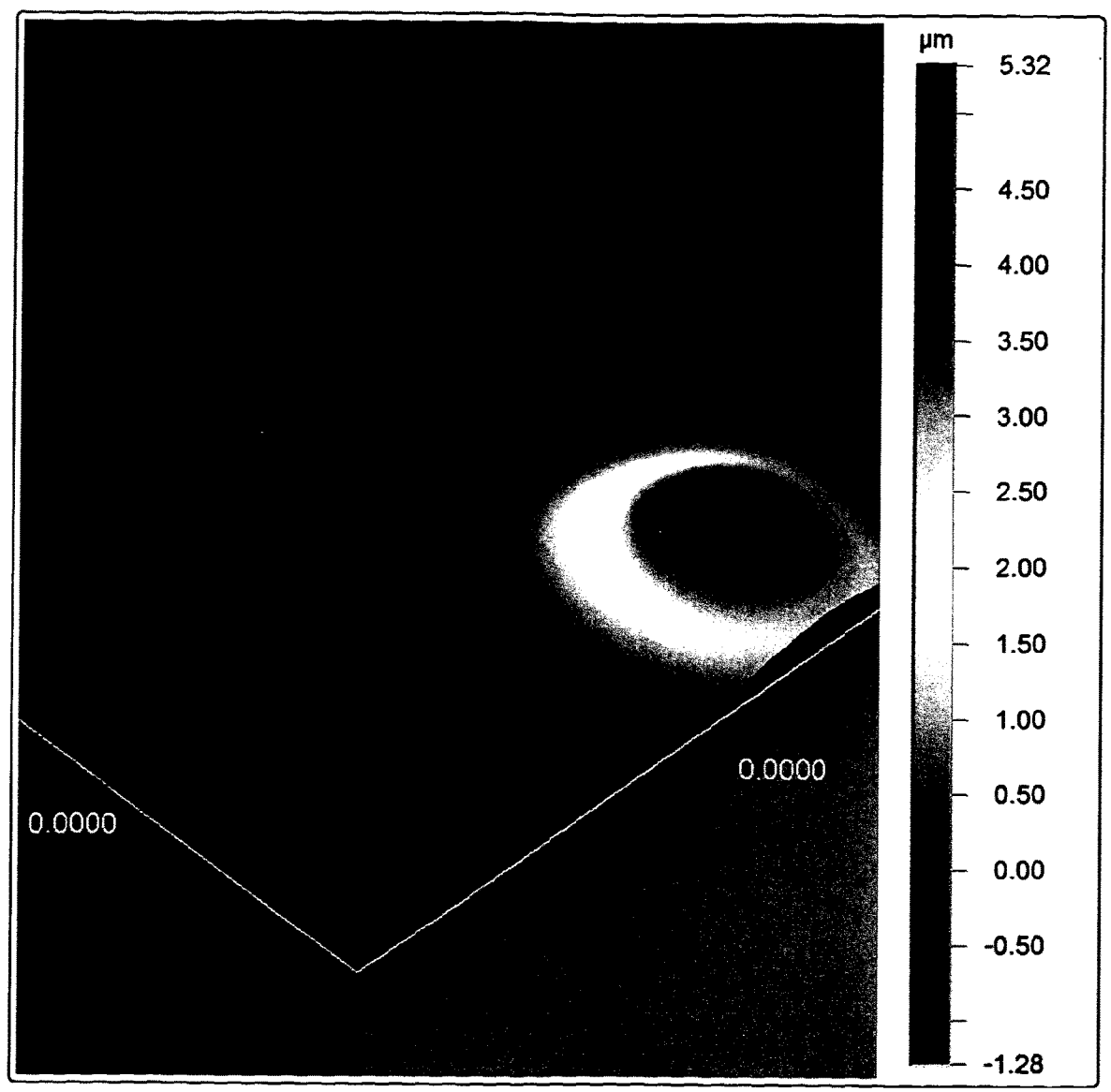
FIG. 1B is a LAM image showing a smooth circular defect in a polyester substrate.
Figure 2:
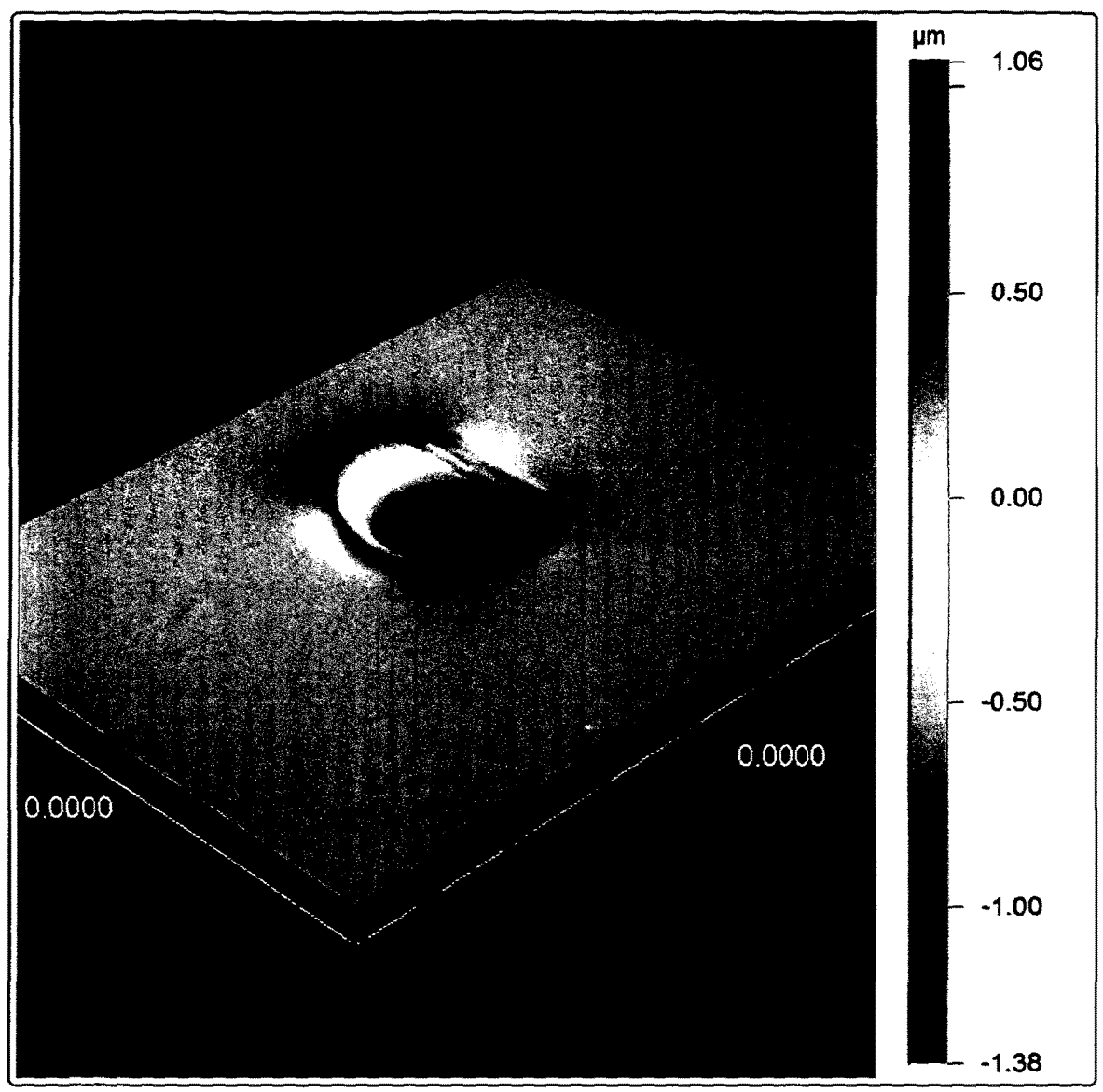
FIG. 2 is a LAM image showing depressions in a polyester substrate, characterized by a central crater and associated raised areas around the crater.

(b) Smooth circular defects are characterised by a central peak with no crater (see FIG. 1B). It is believed that such defects are caused by inclusions which reside relatively deeper within the substrate (2) Depressions are characterised by a central crater, sometimes associated with raised areas around the crater (see FIG. 2). The inventors believe such defects are caused primarily by imperfections (such as gels or gel-like features) in the strippable sacrificial layer.

Figure 3:
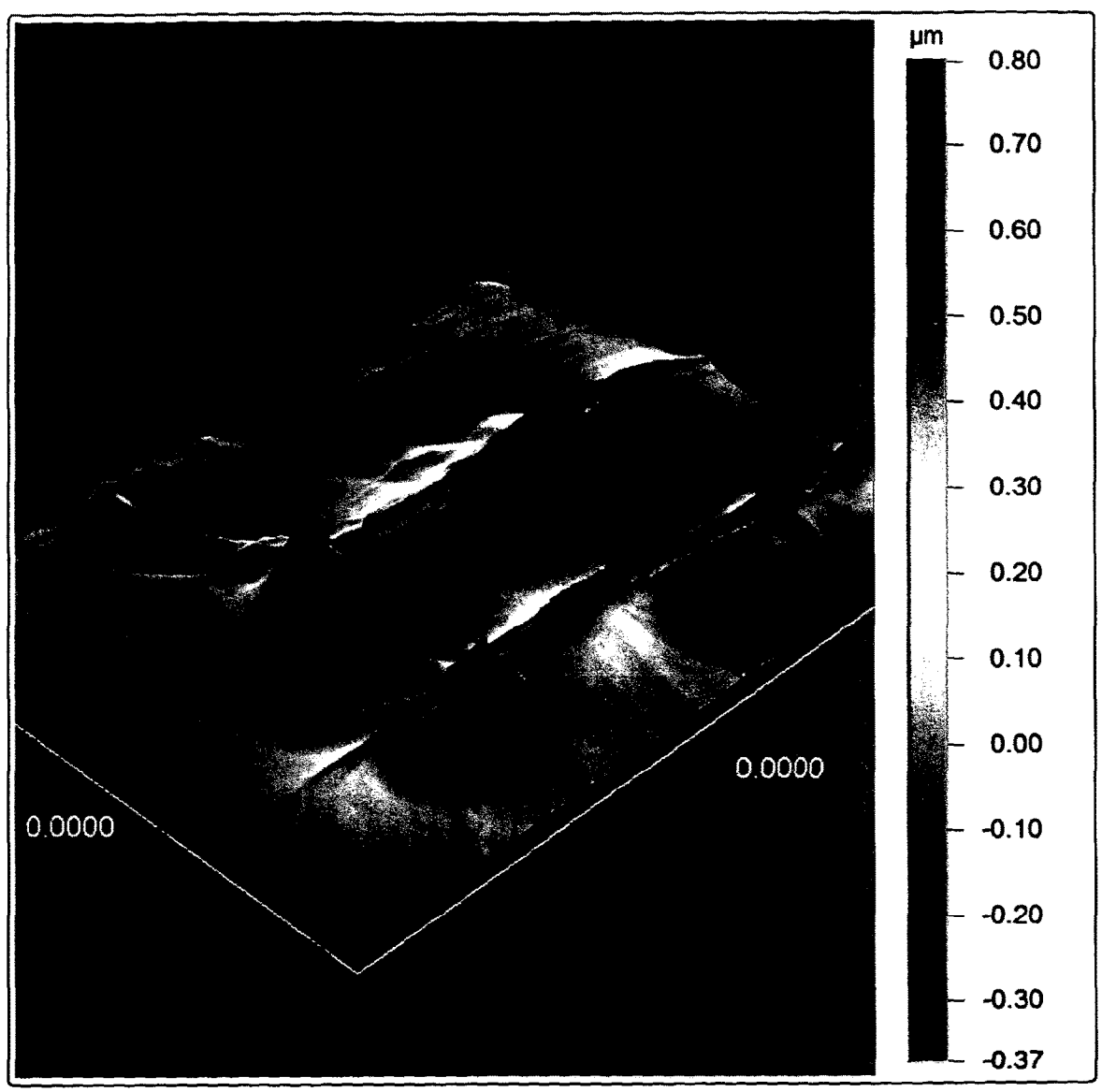
FIG. 3 is a LAM image showing gel-like features or streaks in a polyester substrate, characterized by globular surface features or elongated regions of raised ridges and associated shallow valleys either side of the ridges.

(3) Gel-like features or streaks are characterised by globular surface features or elongated regions of raised ridges sometimes associated with shallow valleys either side of the ridge (see FIG. 3). The inventors believe such defects result from extrusion events, such as die-lip edge flow disturbances and extruded degraded polymer.

Upon removal of the strippable sacrificial layer, the polyester substrate preferably exhibits one or more of the following intrinsic surface roughness properties, particularly wherein intrinsic surface roughness is evaluated in respect of the major intrinsic surface defects defined above as (1a), (1b), (2) and (3), and wherein the values of peak height are expressed as the Rp parameter defined herein and the values of crater depth are expressed as the Rv parameter defined herein and measured by phase shift interferometry (PSI) or vertical scanning interferometry (VSI) in the LAM technique as described hereinbelow:

(i) The number ($N_{DT}$) of all defects with a vertical amplitude, orthogonal to the film plane (i.e. peaks and troughs), of greater than about 0.25 μm and less than about 30 μm above and/or below the mean surface (as defined herein) is no more than 1000, preferably no more than 750, preferably no more than 500, preferably no more than about 400, preferably no more than about 300, preferably no more than 200, preferably no more than 100, preferably no more than 75, preferably no more than 50, and preferably no more than 25, per 31×33 cm area of film surface.

(ii) The number ($N_{PP}$) of pinch-point peaks (1a) with a peak height of greater than about 0.25 μm and less than about 30 μm is no more than 100, preferably no more than 80, preferably no more than 70, preferably no more than 60, preferably no more than 50, preferably no more than 40, preferably no more than 30, and preferably no more than 20, per 31×33 cm area of film surface.

(iii) The number ($N_{GS}$) of gel-like features or streaks (3) with a peak height of greater than about 0.25 μm and less than about 30 μm is no more than 10, preferably no more than 5, preferably no more than 2, and preferably zero, per 31×33 cm area of film surface.

(iv) The improvement ($\Delta$-$N_{DT}$) in the parameter ($N_{DT}$), relative to a control polyester substrate manufactured without the strippable sacrificial layer, wherein $\Delta$-$N_{DT}$ is defined as

[$N_{DT}$ of control substrate]/[$N_{DT}$ of stripped inventive substrate]

is preferably at least 2, preferably at least 4, preferably at least 6, preferably at least 7, preferably at least 10.

(v) The improvement ($\Delta$-$N_{PP}$) in the parameter ($N_{PP}$), relative to a control polyester substrate manufactured without the strippable sacrificial layer, wherein $\Delta$-$N_{PP}$ is defined as:

[$N_{PP}$ of control substrate]/[$N_{PP}$ of stripped inventive substrate]

is at least 2, preferably at least 4, preferably at least 6, preferably at least 7, preferably at least 10.

(vi) The improvement ($\Delta$-$N_{GS}$) in the parameter ($N_{GS}$), relative to a control polyester substrate manufactured without the strippable sacrificial layer, wherein $\Delta$-$N_{GS}$ is defined as:

[$N_{GS}$ of control substrate]/[$N_{GS}$ of stripped inventive substrate]

is at least 2, preferably at least 4, preferably at least 6, preferably at least 7, preferably at least 10.

If desired, the techniques described herein to measure the intrinsic macro-roughness can also be used to measure the lateral dimensions of the defects attributable to extrinsic roughness. Such extrinsic defects are defined herein as irregularly shaped features having positive topography (i.e. features which are above the mean surface level of the film) with substantially no negative topography (i.e. features which are below the mean surface level of the film). If desired, the film can be characterised in terms of the number (NE) of extrinsic defects (as defined above) with a minimum lateral dimension of greater than 7.14 μm, per 31×33 cm area of film surface, and measured by single frame interferometry (SFI) in the LAM technique as described hereinbelow.

The composite film of the present invention may be advantageously used in any application which requires a high-quality defect-free polyester substrate surface exhibiting high cleanliness and high smoothness. Thus, the composite film may be advantageously used in to provide a clean polyester substrate suitable for use in the manufacture of electronic or opto-electronic devices, such as electroluminescent (EL) display devices (particularly organic light emitting display (OLED) devices), electrophoretic displays (e-paper), photovoltaic (PV) cells and semiconductor devices (such as organic field effect transistors, thin film transistors and integrated circuits generally), particularly flexible such devices. Other applications include the provision of optical films, medical devices and decorative films.

A subsequently applied layer may be a barrier layer, i.e. a layer which provides high resistance to gas and solvent permeation, which is typically applied in a sputtering process at elevated temperatures. A barrier layer may be organic or inorganic, should exhibit good affinity for the layer deposited thereupon, and be capable of forming a smooth surface. Materials which are suitable for use to form a barrier layer are disclosed, for instance, in U.S. Pat. No. 6,198,217.

A subsequently applied layer may be a conductive layer, which is often applied in a sputtering process at elevated temperatures.

According to a further aspect of the invention, there is provided the use of a layer comprising an ethylene-methacrylic acid (EMAA) copolymer as a strippable sacrificial layer in a coextruded biaxially oriented composite film further comprising a polyester substrate layer, as described herein, wherein said EMAA layer is disposed on one or both surfaces of said polyester substrate layer.

According to a further aspect of the invention, there is provided the use of a layer comprising an ethylene-methacrylic acid (EMAA) copolymer as a strippable sacrificial layer in a coextruded biaxially oriented composite film further comprising a polyester substrate layer, as described herein, wherein said EMAA layer is disposed on one or both surfaces of said polyester substrate layer, for the purposes of:

(i) protecting a surface of said polyester substrate layer from damage and/or contamination and/or debris during transport and/or storage; and/or (ii) reducing the intrinsic surface defects of said polyester substrate, relative to the same polyester substrate manufactured under the same conditions in the absence of said strippable sacrificial layer.

According to a further aspect of the invention, there is provided a method of protecting a surface of a substrate from damage and/or contamination and/or debris during transport and/or storage, said method comprising the steps of:

(i) providing a coextruded biaxially oriented composite film comprising a polyester substrate layer and disposed on one or both surfaces thereof a strippable sacrificial layer comprising an ethylene-methacrylic acid (EMAA) copolymer as defined herein; and (ii) removing said strippable sacrificial layer from said substrate prior to use or further processing of said substrate.

According to a further aspect of the invention, there is provided a method of reducing defects in a functional layer (particularly a conductive or barrier layer) applied to a substrate, said method comprising the steps of:

(i) providing a coextruded biaxially oriented composite film comprising a polyester substrate layer and disposed on one or both surfaces thereof a strippable sacrificial layer comprising an ethylene-methacrylic acid (EMAA) copolymer as defined herein;

(ii) removing said strippable sacrificial layer from said substrate; and (iii) applying said functional layer to said substrate.

According to a further aspect of the invention, there is provided an electronic or opto-electronic device, optical film, medical device or decorative film derived from the coextruded biaxially oriented composite film defined herein from which said strippable sacrificial layer has been removed.

According to a further aspect of the invention, there is provided an electronic or opto-electronic device comprising a polyester substrate layer, wherein said polyester substrate layer is derived from a coextruded biaxially oriented composite film comprising a polyester substrate layer and disposed on one or both surfaces thereof a strippable sacrificial layer comprising an ethylene-methacrylic acid (EMAA) copolymer as defined herein, wherein said strippable sacrificial layer has been removed from said composite film prior to or during incorporation into or manufacture of said electronic or opto-electronic device.

According to a further aspect of the invention, there is provided a method of manufacture of an electronic or opto-electronic device, optical film, medical device or decorative film, said method comprising the steps of:

(i) providing a coextruded biaxially oriented composite film comprising a polyester substrate layer and disposed on one or both surfaces thereof a strippable sacrificial layer comprising an ethylene-methacrylic acid (EMAA) copolymer as defined herein; and (ii) removing said strippable sacrificial layer from said substrate prior to the use of said substrate in said electronic or opto-electronic device or medical device, or in or as said optical or decorative film.

The electronic or opto-electronic device may further comprise a barrier or conductive layer disposed on said polyester substrate. Of particular interest are electronic or opto-electronic devices selected from electroluminescent (EL) display devices (particularly organic light emitting display (OLED) devices), electrophoretic displays (e-paper), photovoltaic (PV) cells and semiconductor devices (such as organic field effect transistors, thin film transistors and integrated circuits generally), particularly flexible such devices.

Property Measurement

The following analyses were used to characterize the films described herein:

(i) Clarity is evaluated by measuring total luminance transmission (TLT) and haze (% of scattered transmitted visible light) through the total thickness of the film using an MS7D spherical hazemeter (Diffusion Systems) according to the standard test method ASTM D1003.

(ii) Transmission Optical Density (TOD) is measured using a Macbeth Densitometer TR 927 (obtained from Dent and Woods Ltd, Basingstoke, UK) in transmission mode.

(iii) Intrinsic viscosity (in units of dlg) is measured by solution viscometry in accordance with ASTM D5225-98(2003) on a Viscotek™ Y-501C Relative Viscometer (see, for instance, Hitchcock, Hammons & Yau in *American Laboratory* (August 1994) "The dual-capillary method for modern-day viscometry") by using a 0.5% by weight solution of polyester in o-chlorophenol at 25° C. and using the Billmeyer single-point method to calculate intrinsic viscosity:

$$\eta = 0.25\eta_{red} + 0.75(\ln \eta_{rel})/c$$

wherein:
$\eta$=the intrinsic viscosity (in dL/g).
$\eta_{rel}$=the relative viscosity.
c=the concentration (in g/dL), &
$\eta_{red}$=reduced viscosity (in dL/g), which is equivalent to $(\eta_{rel}-1)/c$ (also expressed as $\eta_{sp}/c$ where $\eta_{sp}$ is the specific viscosity).

(iv) Thermal shrinkage is assessed for film samples of dimensions 200 mm×10 mm which were cut in specific directions relative to the machine and transverse directions of the film and marked for visual measurement. The longer dimension of the sample (i.e. the 200 mm dimension) corresponds to the film direction for which shrinkage is being tested, i.e. for the assessment of shrinkage in the machine direction, the 200) mm dimension of the test sample is oriented along the machine direction of the film. After heating the specimen to the predetermined temperature of 150° C. (by placing in a heated oven at that temperature) and holding for an interval of 30 minutes, it was cooled to room temperature and its dimensions re-measured manually. The thermal shrinkage was calculated and expressed as a percentage of the original length.

(v) Melt Flow Index (MFI) is measured herein according to ASTM D1238 or ISO-1133, depending on the polymer used. The EMAA copolymers used in the present invention are analysed in accordance with ASTM D1238 at a temperature of 190° C. and a mass of 2.16 kg. Suitable MFI ranges for the EMAA copolymers used in the present invention are in the range from about 0.5 to about 50 g/10 min, preferably from about 1 to about 25 g/10 min, typically from about 2 to about 20 g/10 min, and more typically from about 2 to about 15 g/10 min.

(vi) Layer thickness is measured by Mercer 122D gauge.

(vii) MD lines are localised high spots or circumferential bands on reels caused by poor film thickness profile and/or reel buckling. Die lines are straight lines in the machine direction that remain in the same location on the melt during filming. Flow lines are lines in the machine or transverse direction that do not remain in the same location on the melt during filming; they are thought to be caused by the transient or migratory presence of polymeric spherical gels (cross-linked) which cause a disturbance in the polymer curtain. The presence of each of these defects in the film was assessed qualitatively by visual inspection by the naked eye (i.e. without a microscope).

(viii) Scratches are low amplitude (typically up to about 1000 nm deep and up to about 1000 nm wide) elongated depressions in the film. They are thought to result from imperfections in the die and rollers used in film manufacture, or from film handling. Scratches are classified herein as intrinsic surface defects, and their presence in the film was assessed qualitatively by optical microscopy (at 2.5× magnification). Of course, extrinsic surface roughness resulting from handling damage during storage or transport can also include the scratching of the film surface, but such defects are not measured herein.

(ix) Peelability is initially assessed using a hand peel test, in which the peelable film is cut with scissors to aid delamination, and the peelable layer is then pulled by hand away from the substrate. This crude test provides a low-cost preliminary indication of the suitability of the film for further analysis and investigation. The grading of the films was as follows:

Grade 1: strippable layer removable in its entirety, with no sign of residue from the strippable layer remaining on the substrate.

Grade 2: strippable layer removable in its entirety, with spots of residue visible on the substrate.

Grade 3: strippable layer fractures when peeled.

Grade 4: strippable layer not possible to remove from substrate (x) Peel force is measured on an SST-3 Seal Strength Tester (RDM Test Equipment) as follows. 10 mm wide strips of film are cut from the web using a thick film tool. If the peelable layer is well-adhered a piece of adhesive tape (Tesa 4104) is used to lift the peelable layer from the PET substrate. The peelable layer is then attached to double-sided tape on the upper jaw of the equipment, and the PET substrate is attached to double-sided tape on the lower jaw. The reading is set to zero before the jaws are moved apart, and the jaws then moved apart at 240 mm/min. The peak value of the force recorded to separate the layers is recorded (grams Force). The results are averaged from three measurements. The apparatus is reset between samples to reset the peak.

(xi) The "micro-roughness" of the substrate surface in fields of view (defined below) selected to be remote from any major surface defects is characterised using conventional non-contacting, white-light, phase-shifting interferometry techniques, which are well-known in the art, using a Wyko NT3300 surface profiler using a light source of wavelength 604 nm. With reference to the WYKO Surface Profiler Technical Reference Manual (Veeco Process Metrology, Ariz., US; June 1998; the disclosure of which is incorporated herein by reference), the characterising data obtainable using the technique include:

Averaging Parameter—Roughness Average (Ra): the arithmetic average of the absolute values of the measured height deviations within the evaluation area and measured from the mean surface.

Averaging Parameter—Root Mean Square Roughness (Rq): the root mean square average of the measured height deviations within the evaluation area and measured from the mean surface.

Peak-to-Valley value ($PV_{95}$): this parameter may be obtained from the frequency distribution of positive and negative surface heights as a function of surface height referenced to the mean surface plane. The value $PV_{95}$ is the peak-to-valley height difference which envelops 95% of the peak-to-valley surface height data in the distribution curve by omitting the highest and lowest 2.5% of datapoints. The $PV_{95}$ parameter provides a statistically significant measure of the overall peak-to-valley spread of surface heights.

The roughness parameters and peak heights are measured relative to the average level of the sample surface area, or "mean surface", in accordance with conventional techniques. (A polymeric film surface may not be perfectly flat, and often has gentle undulations across its surface. The mean surface is a plane that runs centrally through undulations and surface height departures, dividing the profile such that there are equal volumes above and below the mean surface.) The surface profile analysis is conducted by scanning discrete regions of the film surface (between and remote from major defects) within the "field of view" of the surface profiler instrument, which is the area scanned in a single measurement. A film sample may be analysed using a discrete field of view, or by scanning successive fields of view to form an array. The analyses conducted herein utilised the full resolution of the Wyko NT3300 surface profiler, in which each field of view comprises 480×736 pixels. For the measurement of Ra and Rq, the resolution was enhanced using an objective lens having a 50-times magnification. The resultant field of view has dimensions of 90 μm×120 μm, with a pixel size of 0.163 μm. The results of five successive scans over the same portion of the surface area are combined to give an average value. The measurements were conducted using a modulation threshold (a user-determined parameter based on the minimal acceptable signal-to-noise ratio) of 10%, i.e. data points below the threshold are identified as unreliable.

(xii) The macro-roughness of the substrate surface was analysed by large-area metrology (LAM) using a Wyko SSP9910 Single Frame Interferometer, also equipped with both PSI and VSI capability, in order to arrive at values for the parameters of Maximum Profile Peak Height (Rp) and Maximum Profile Crater Depth (Rv), defined as the height (or depth) of the highest peak (or crater/trough) in the evaluation area, as measured from the mean surface. The measurement area of the film was 31×33 cm.

The first step of the technique is to conduct measurements in the SFI (Single Frame Interferometry) mode to produce a low magnification (×2.5) map in order to determine the location of major surface defects in the film area studied. In the SFI mode, the modulation threshold was set at 1%, and the cut-off threshold (another user-determined parameter selected to define the minimum vertical amplitude constituting a major surface defect) was set at 0.25 μm above the mean surface. The skilled man will appreciate that for some laterally smaller defects the pixel size is large in comparison with the peak area in SFI mode, and so at this low magnification the measured peak height measured (which is averaged over the pixel) may be weighted downwards as a result of the larger pixel area. Thus, intrinsic defects in SFI mode are defined as those having a peak height of at least 0.25 μm and spanning greater than 2 adjoining pixels (1 pixel=3.57 μm); and extrinsic defects were considered as those spanning at least 3 adjoining but not necessarily co-linear pixels (7.14 μm in at least one lateral dimension). Intrinsic and extrinsic defects were differentiated herein according to the reflectance profile (extrinsic defects exhibit a reflectance profile which is different from the polyester matrix and typically exhibit a lower reflectance). Intrinsic and extrinsic defects may also be differentiated according to the lateral profile of the defect. The first step in the technique produces (x,y)-coordinates of all the user-defined defects in the film surface.

The second step of the technique is to re-examine the film surface using the same equipment in either phase shifting interferometry (PSI) mode or vertical scanning interferometry mode (VSI) to produce a high magnification (×25) map. The skilled man will appreciate that PSI mode is generally appropriate for smoother surfaces where the height difference between adjoining pixels does not lead to data loss. In contrast, VSI mode is more suited to relatively rougher surfaces in order to avoid such data loss. In the second step the instrument revisits the defects identified by their (x,y)-coordinates determined in the first step, in order to yield more precise information about those regions of the film sample in which major surface defects were located, and it is the major intrinsic surface defects which are of primary interest here. In the PSI mode, the cut-off threshold was set at 0.25 µm above the mean surface and the modulation threshold was set at 10%. In the VSI mode, the cut-off threshold was also set at 0.25 µm and the modulation threshold was set at 0.2%. In the PSI mode, the relatively higher modulation threshold means that the extrinsic defects can be inferred from "data-loss" regions. Intrinsic defects were considered as those covering at least 9 adjoining but not necessarily co-linear pixels (I pixel=0.35 µm) and at least 0.25 µm in peak height. The values described herein for $N_{DT}$, $N_{PP}$ and $N_{GS}$ are derived from the PSI scans or VSI scans, as appropriate, and particularly from the PSI scans.

(xiii) Further surface analysis was conducted using XPS and static SIMS spectroscopy, using a Kratos "Axis Ultra" instrument and an Ion-Tof "ToFSIMS IV" instrument, respectively. The objective of the analyses was to determine the presence of any residue from the strippable sacrificial layer on the polyester substrate layer alter stripping of the strippable layer.

X-ray photoelectron spectroscopy (XPS) is a quantitative spectroscopic technique which measures the elemental composition, empirical formula, chemical and electronic states of elements that exist within a material. XPS spectra are obtained by using X-rays to irradiate a material while measuring the kinetic energy and number of the emitted electrons from the top 1 to 10 nanometers of the material. The detection limit is around 1 atom in 1000 (excluding H, i.e. 0.1 atomic percent or 1000 ppm).

Secondary ion mass spectrometry (SIMS) is a technique involving sputtering material surfaces with a primary ion beam and collecting and analyzing emitted secondary ions. A mass spectrometer is used to measure the secondary ions to determine the elemental and/or molecular composition of the material surface. Static SIMS is the process used in atomic monolayer analysis of material surfaces, and has a typical sampling depth of about 1 nm. SSIMS is not generally suitable as a quantitative technique for individual analyses, but can usefully be used to compare a series of similar sample surfaces via analysis of peak area ratios as a measure of the relative amounts of identified species present in those surfaces.

Freshly peeled surfaces were generated by cutting and tearing the coated polyester substrate. Both sides of the peel were analysed. Small pieces (ca. 1 cm×1 cm) were cut from the main sample for analysis (ca. 10 cm×15 cm) using clean stainless steel scissors. Samples for analysis were mounted on to suitable sample holders using small pieces of silicone-free double-sided tape. The samples for analysis were handled using clean stainless steel tweezers at all times.

For the XPS analysis, data were recorded from a ca. 300 µm×700 µm elliptical area using monochromated Al kα X-rays. A survey scan was recorded at 160 eV pass energy to identify all elements present on the surface; these were also used to quantify the surface composition. High-resolution spectra were also recorded at 20 eV pass energy in order to identify the chemical environment for specific elements. The results are presented as relative atomic percentage compositions. The expanded uncertainty (Y) in atomic percentage units, associated with a measured atomic percentage composition (X) was calculated for polymer and organic materials analysed using survey scan conditions from the expression Y=mX+c where m=0.027 and c=0.14. The reported expanded uncertainty is based on a standard uncertainty multiplied by a coverage factor of k=2, providing a level of confidence of approximately 95%.

For the SSIMS analysis, positive and negative ion spectra were recorded from fresh areas of each sample with high mass resolution (m/Δm ca. 6000)) up to m/z 2000 in all cases.

(xiv) Melting temperature is determined by differential scanning calorimetry (DSC) according to ASTM D3418.

(xv) The VICAT softening point is determined by ASTM D1525.

The invention is further illustrated by the following examples. The examples are not intended to limit the invention as described above. Modification of detail may be made without departing from the scope of the invention.

EXAMPLES

Examples 1 to 23

Attempts were made to manufacture a series of coextruded films having an AB layer structure. A polymer composition comprising unfilled PET was co-extruded with a series of polymers (see Table 1), cast onto a cooled rotating drum, optionally pre-heated to a temperature of 80 to 81° C. and stretched in the direction of extrusion to approximately 3.4 times its original dimensions. Where possible, the film was heated to a temperature of about 95° C., passed into a stenter oven at a temperature of 110° C. where the film was stretched in the sideways direction to approximately 3.6 times its original dimensions, and then the biaxially-stretched film was heat-set by successive heating in three zones of defined temperature (225, 225 and 190° C.) by conventional means at a film-web speed of 10.8 m/min; approximate residence time in each of the three zones was 40 seconds. Table 1 characterises the manufacturing processes and the resulting films.

TABLE 1

| Ex. | Layer A Polymer | MFI (test method)† | thickness (μm) | Layer B (PET) thickness (μm) | Observations |
|---|---|---|---|---|---|
| 1 | EMAA (Nucrel ® 0908HS; DuPont ®) | 8 (a) | 10 to 16 | 80-120 | No major process issues. Biaxially oriented film manufactured with A Layer of even thickness. No MD or flow lines. Clean peel. |
| 2 | EMAA (Nucrel ® 0411HS; DuPont ®) | 11 (a) | 10 to 16 | 80-120 | No major process issues. Biaxially oriented film manufactured with A Layer of even thickness. No MD or flow lines. Clean peel. |
| 3 | Sodium ionomer of EMAA (Surlyn ® 1605; DuPont ®) | 2.5 (a) | 10 to 16 | 80-120 | Biaxially oriented film manufactured, but MD lines present in PET and Surlyn layers. Clean peel |
| 4 | Zinc ionomer of EMAA (Surlyn ® 1652; DuPont ®) | 5.2 (a) | 10 to 16 | 80-120 | Biaxially oriented film manufactured, but MD lines present in PET and Surlyn layers. Clean peel. |
| 5 | Polypropylene (DSM ®) | 4.5 (b) | 3 to 7 | 80-100 | Biaxially oriented film manufactured, but Layer A residue remains on PET after peel. |
| 6 | Polypropylene (HKR 102; Sasol ®) | 3.5 (b) | 40-50 | 500-600 | Not possible to make a biaxially oriented film, due to partial peel-off of Layer A after the forward draw stage. Monoaxially oriented film only manufactured. Layer A exhibited flow lines and uneven layer thickness. |
| 7 | Polypropylene (PPH 3060; Total ®) | 1.8 (b) | 70-100 | 250-350 | Not possible to make a biaxially oriented film. Layer A peeled off at the forward draw stage. Cast film only manufactured. |
| 8 | Polypropylene copolymer (PPR 7220; Total ®)) | 10 (b) | 40-50 | 300-400 | Monoaxially oriented film only made. Layer A exhibited MD lines. |
| 9 | Polypropylene copolymer (PPC 5660; Total ®)) | 7 (b) | 6 to 14 | 100-200 | Biaxially oriented film made, although some inter-layer adhesion loss during manufacture. Layer A exhibited uneven thickness, flow lines, and high haze (>50%). Substrate exhibited increased haze and surface micro-roughness after removal of layer A. |
| 10 | Polypropylene copolymer (PPR 3260; Total ®)) | 1.8 (b) | 55-65 | 200-400 | Monoaxially oriented film only made. Layer A exhibited flow lines, heavy MD lines and large thickness variation in transverse dimension. |
| 11 | Polypropylene copolymer (CPV 340; Sasol ®) | 16 (b) | 55-65 | 200-400 | Not possible to make a biaxially or monoaxially oriented film. Layer A peels off at cast film stage. |
| 12 | Polypropylene (HRV 140; Sasol ®) | 21 (b) | 55-65 | 200-400 | Not possible to make a biaxially or monoaxially oriented film. Layer A peels off at cast film stage. |
| 13 | Polypropylene (PPH 10042; Total ®)) | 35 (b) | 55-65 | 200-400 | Not possible to make a biaxially or monoaxially oriented film. Layer A peels off at cast film stage. |
| 14 | Polypropylene copolymer (CTV 448; Sasol ®) | 50 (b) | 55-65 | 200-400 | Not possible to make a biaxially or monoaxially oriented film. Layer A peels off at cast film stage. |
| 15 | Polyethylene (HPs900-C; Nova ®) | 1 (a) | 10-16 | 40-50 | Biaxially oriented film made. Layer A exhibited uneven thickness. Residue and remnants of Layer A remains on base layer after peel. |
| 16 | Polystyrene (Edistir 2380; Polimeri ®) | 2 (c) | 120 (brittle) | 400-500 | Cast film only made. Not possible to make a biaxially or monoaxially oriented film. Layer A too brittle and peeled off at cast and forward draw stage. |
| 17 | Polystyrene (Edistir 2560; Polimeri ®) | 3.8 (c) | 165-185 | 400-500 | Cast film only made. Not possible to make a biaxially or monoaxially oriented film. Layer A peels off at forward draw stage or earlier. Layer A too brittle for clean peel. |
| 18 | Polystyrene (Edistir HIPS R850E; Polimeri ®) | 4 (c) | | 30 | Biaxially oriented film made. Layer A exhibits poor mechanical strength and fractures on peeling. |
| 19 | Acrylonitrile butadiene styrene (HI100 Natural; LG Chemical ®) | 1 (d) | | | Biaxially oriented film made. Layer A is brittle but does not peel away from base layer |
| 20 | Nylon 6,6 (Vydyne 66B; Ascend ®) | | 60-100 | 600-700 | Not possible to make a biaxially or monoaxially oriented film. Layer A adheres to cast base layer but separates in forward draw |
| 21 | Ethylene vinyl acetate (Appeel ® 11D554; DuPont ®) | 9.5 (a) | | 500-600 | Layer A adheres to cast base layer, but not manufacture terminated due to fuming of polymer. |
| 22 | Ethylene vinyl acetate (Appeel ® 22D843; DuPont ®) | 2.65 (a) | | N/A | Biaxially oriented film made. Layer A not peelable from base layer. |
| 23 | Polyethylene naphthalate (Teijin ®) | | | N/A | Biaxially oriented film made. Layer A not peelable from base layer. |

†The test methods used for the Melt Flow Index of the polymer of Layer A were:
(a) ASTM D1238; using a temperature of 190° C. and a mass of 2.16 kg
(b) ISO 1133; using a temperature of 230° C. and a mass of 2.16 kg
(c) ISO 1133; using a temperature of 200° C. and a mass of 5 kg
(d) ASTM D1238; using a temperature of 200° C. and a mass of 5 kg Where it was possible to manufacture a biaxially oriented composite film which exhibited adequate mechanical strength and little or no inter-layer delamination during manufacture, the film was analysed using the hand-peel test described herein. In this test, Examples 1 to 4 and 9 satisfied grade 1; Example 5 satisfied grade 2, while the remaining Examples either were categorised as grade 3 or 4 or were unable to be manufactured as a biaxially oriented composite film. The peel force of Examples 1 to 5 and 9 was then measured according to the method described herein, and the results are set out in Table 2 below.

The haze, TLT and Ra of the polyester substrate immediately after peeling were examined for Examples 1 to 5 and 9, and the results are reported in Table 2 below, along with a control film consisting of the mono-layer PET film corresponding to the substrate of the Examples. The haze values of Examples 1 to 5 were excellent, whereas the haze for Example 9 was significantly worse. Similarly, the Ra values for surface micro-roughness of Examples 1 to 5 were all much lower than that of Example 9, indicating that the polypropylene strippable layer had disadvantageously imparted some additional texture or roughness or other defect during manufacture or storage of the composite film, or during the act of stripping.

The presence of scratches on the film surface was assessed by optical microscopy, as described herein. The surface of the control film exhibited a significant number of scratches, whereas the freshly peeled surfaces of Examples 1 to 5 and 9 exhibited none.

TABLE 2

| Example | Hand-peel test (grade) | Peel Force (grams-Force) | TLT (%) | Haze (%) | Ra (nm) |
|---|---|---|---|---|---|
| Control | — | — | 84.6 | 0.47 | 0.98 |
| 1 | 1 | 202 | 84.9 | 1.51 | 0.8 |
| 2 | 1 | 63.8 | 86.6 | 1.09 | 4.01 |
| 3 | 1 | 176 | 85.2 | 0.64 | 3.31 |
| 4 | 1 | 60 | 85.4 | 0.81 | 1.33 |
| 5 | 2 | 29 | 85.5 | 1.5 | — |
| 9 | 1 | 5.3 | 85.3 | 9.55 | 81.4 |

The experiments demonstrate that the EMAA strippable layers uniquely and unexpectedly show the required combination of properties.

The films of Examples 1 and 2 were also analysed by the XPS and SSIMS techniques described hereinabove in order to determine the presence of any chemical residue on the substrate immediately after peeling away the strippable layer. In both analyses, no evidence for any chemical residue of the strippable layer was found on the PET substrate for either Example 1 or Example 2.

In the XPS analyses, the chemical composition (measured as relative atomic percentage composition) and high-resolution spectra of the surface of the freshly peeled PET substrate corresponded to those typically observed for PET film. Thus, the measured level for the relative atomic percentage of carbon of the freshly peeled surface fell within the typical range for PET surfaces of 72.0-76.4 atomic %. The C1s and O1s high resolution spectra from the surface of the freshly peeled PET substrate were also typical of clean PET, showing C—C, C—O, O—C=O in the expected proportions.

In the SSIMS analyses, the spectra recorded from the surface of the freshly peeled PET substrate were consistent with the presence of a pristine PET layer.

Examples 24 to 26

The EMAA-coated examples from the first set of experiments were investigated further, in particular by measuring the intrinsic surface roughness by the LAM technique described hereinabove. Example 25 (Nucrel® 0908HS) and Example 26 (Nucrel® 411HS) are coextruded films manufactured according to Examples 1 and 2. Example 24 is a control example which consists of a coextruded bi-layer PET film in which both layers have the same composition as the substrate layer in Example 1, and otherwise processed in the same way as Example 1. The total thickness, and each layer thickness, of Example 24 were the same as those in coextruded films of Example 25 and 26, in order to provide similarity in processing conditions. Thus, the film of Example 24 is made up of a thin PET layer A and a thick PET layer B. The surfaces of the polyester substrate in Examples 25 and 26 were analysed directly after stripping the sacrificial EMAA layer by hand. The surface of the thin PET layer A of the polyester substrate of control Example 24 was analysed directly after manufacture. The results are presented in Table 3 below. The values for $N_{DT}$, $N_{PP}$ and $N_{GS}$ are derived from PSI scans. The values for $\Delta$-$N_{DT}$, $\Delta$-$N_{PP}$ and $\Delta$-$N_{GS}$ are calculated for Examples 25 and 26 using Example 24 as the control film. All three examples were manufactured on a standard film-forming line and no special steps were taken to provide to a clean environment or to reduce the amount of air-borne dust and debris.

TABLE 3

| Ex. | $N_{DT}$ | $\Delta$ - $N_{DT}$ | $N_{PP}$ | $\Delta$ - $N_{PP}$ | $N_{GS}$ | $\Delta$ - $N_{GS}$ | $N_E$ |
|---|---|---|---|---|---|---|---|
| Ex. 24 | 2796 | — | 366 | — | 43 | — | 76 |
| Ex. 25 | 718 | 3.9 | 63 | 5.8 | 0 | → ∞ | 13 |
| Ex. 26 | 443 | 6.3 | 54 | 6.8 | 0 | → ∞ | 36 |

The data in Table 3 demonstrate that not only does the strippable layer protect the polyester substrate from extrinsic debris (and the damage that results from such extrinsic debris), it also unexpectedly improves (i.e. decreases) the intrinsic surface roughness of the substrate.

Examples 27 and 28

The EMAA-coated examples were investigated further using the LAM technique. Example 27 is a further control example and consists of a monolayer of unfilled PET of the same composition as the PET layers in the coextruded bi-layer film of (control) Example 24. Example 28 is a coextruded film corresponding to Example 26, comprising a substrate layer of the same unfilled PET of Example 27, and a strippable sacrificial layer of Nucrel® 0411HS. The PET layer in each of Examples 27 and 28 is the same thickness and is derived from the same (primary) extruder. The surface of the PET substrate in Example 28 was analysed as before and directly after stripping the sacrificial layer by hand, and then compared with the control surface of the PET monolayer film of Example 27 which was analysed directly after manufacture. The results are presented in Table 4 below. The absolute defect numbers in Table 4 are lower than in Table 3 because additional steps were taken during film manufacture to provide a clean environment. Nevertheless, the data confirm the unexpected result observed from the comparison of Examples 24 and 26.

TABLE 4

| Ex. | $N_{DT}$ | $\Delta$ - $N_{DT}$ | $N_{PP}$ | $\Delta$ - $N_{PP}$ | $N_{GS}$ | $\Delta$ - $N_{GS}$ | $N_E$ |
|---|---|---|---|---|---|---|---|
| Ex. 27 | 94 | — | 22 | — | 33 | — | 36 |
| Ex. 28 | 81 | 1.16 | 4 | 5.5 | 1 | 33 | 6 |

The invention claimed is:

1. A coextruded biaxially oriented composite film comprising a polyethylene terephthalate (PET) substrate layer and disposed on one or both surfaces thereof an ethylene-methacrylic acid (EMAA) copolymer strippable sacrificial layer, wherein the strippable sacrificial layer has a thickness in the range of from 2 to 200 μm, and the EMAA copolymer has a melt flow index of 0.5 to about 50 g/10 min, and wherein the EMAA copolymer is not an ionomer and does not contain metal ions.

2. The film according to claim 1 wherein the methacrylic acid is present in the EMAA copolymer in the range of from about 2 to about 15 wt % of the copolymer.

3. The film according to claim 1 wherein a thickness of the PET substrate layer is in the range of from about 5 to about 500 μm.

4. The film according to claim 1 wherein the adhesive strength of the strippable sacrificial layer to the PET substrate is such that the peel force is in the range of from about 20 to about 250 gF.

5. The film according to claim 1 wherein the PET substrate has a haze of no more than 15% and/or a total luminous transmission (TLT) for light in the visible region (400 nm to 700 nm) of at least 80%.

6. The film according to claim 1 wherein the PET substrate exhibits a shrinkage of no more than 3% at 150° C. over 30 minutes.

7. The film according to claim 1 wherein the PET substrate exhibits an Ra of less than 10 nm upon removal of the strippable sacrificial layer(s).

8. A method of protecting a surface of a substrate from damage and/or contamination and/or debris during transport and/or storage, said method comprising the steps of:
(i) providing a coextruded composite film comprising a polyethylene terephthalate (PET) substrate layer and disposed on one or both surfaces thereof a strippable sacrificial layer according to claim 1; and
(ii) removing said strippable sacrificial layer from said PET substrate prior to use or further processing of said substrate.

9. A method of reducing defects in a functional layer applied to a substrate, said method comprising the steps of:
(i) providing a coextruded composite film comprising a polyethylene terephthalate (PET) substrate layer and disposed on one or both surfaces thereof a strippable sacrificial layer according to claim 1;
(ii) removing said strippable sacrificial layer from said PET substrate; and
(iii) applying said functional layer to said PET substrate.

10. The method according to claim 9 wherein said functional layer is a conductive layer or barrier layer.

11. A method of using an ethylene-methacrylic acid (EMAA) copolymer layer as a strippable sacrificial layer in a coextruded biaxially oriented composite film further comprising a polyethylene terephthalate (PET) substrate layer, as defined in claim 1, wherein said EMAA copolymer layer is disposed on one or both surfaces of said polyester substrate layer, said method consisting of stripping the EMAA copolymer layer from the PET substrate layer, and wherein the EMAA copolymer is not an ionomer and does not contain metal ions.

12. The film according to claim 1, wherein said one or both surfaces exhibit(s) a number ($N_{GS}$) of gel-like defects with a peak height of greater than about 0.25 μm and less than about 30 μm of no more than 10 per 31×33 cm area of film surface upon removal of the strippable sacrificial layer, and/or
wherein the improvement ($\Delta\text{-}N_{GS}$) in the parameter ($N_{GS}$), relative to a control PET substrate manufactured without the strippable sacrificial layer, is at least 2, wherein $\Delta\text{-}N_{GS}$ is defined as:

[$N_{GS}$ of said control PET substrate]/[($N_{GS}$) of surface of said PET substrate layer upon removal of said strippable sacrificial layer].

13. The film according to claim 1, wherein said one or both surfaces exhibit(s) a number ($N_{DT}$) of defects with a vertical amplitude, orthogonal to the film plane, of greater than about 0.25 μm and less than about 30 μm above and/or below the mean surface of no more than 1000 per 31×33 cm area of film surface upon removal of the strippable sacrificial layer, and/or
wherein the improvement ($\Delta\text{-}N_{DT}$) in the parameter ($N_{DT}$), relative to a control PET substrate manufactured without the strippable sacrificial layer, is at least 2, wherein $\Delta\text{-}N_{DT}$ is defined as:

[$N_{DT}$ of said control PET substrate]/[($N_{DT}$) of surface of said PET substrate layer upon removal of said strippable sacrificial layer].

14. The film according to claim 1, wherein said one or both surfaces exhibit(s) a number ($N_{PP}$) of pinch-point peaks with a peak height of greater than about 0.25 μm and less than about 30 μm of no more than 100 per 31×33 cm area of film surface upon removal of the strippable sacrificial layer, and/or
wherein the improvement ($\Delta\text{-}N_{PP}$) in the parameter ($N_{PP}$), relative to a control PET substrate manufactured without the strippable sacrificial layer, is at least 2, wherein $\Delta\text{-}N_{PP}$ is defined as:

[$N_{PP}$ of said control PET substrate]/[($N_{PP}$) of surface of said PET substrate layer upon removal of said strippable sacrificial layer].

15. An electronic or opto-electronic device, optical film, medical device or decorative film derived from a coextruded biaxially oriented composite film as defined in claim 1 from which said strippable sacrificial layer has been removed.

16. The electronic or opto-electronic device according to claim 15 comprising a polyethylene terephthalate (PET) substrate layer derived from the coextruded composite film comprising said PET substrate layer and disposed on one or both surfaces thereof a strippable sacrificial layer, wherein said strippable sacrificial layer is removed from said composite film prior to or during incorporation into or manufacture of said electronic or opto-electronic device.

17. The electronic or opto-electronic device according to claim 15, further comprising a barrier or conductive layer, wherein said barrier or conductive layer is disposed on said PET substrate in said electronic or opto-electronic device.

18. The electronic or opto-electronic device according to claim 15, selected from electroluminescent (EL) display devices, electrophoretic display devices, photovoltaic cells and semiconductor devices.

19. The device according to claim 15, wherein said one or both surfaces exhibit(s) a number ($N_{GS}$) of gel-like defects with a peak height of greater than about 0.25 μm and less than about 30 μm of no more than 10 per 31×33 cm area of film surface upon removal of the strippable sacrificial layer, and/or
wherein the improvement ($\Delta\text{-}N_{GS}$) in the parameter ($N_{GS}$), relative to a control PET substrate manufactured without the strippable sacrificial layer, is at least 2, wherein $\Delta\text{-}N_{GS}$ is defined as:

[$N_{GS}$ of said control PET substrate]/[($N_{GS}$) of surface of said PET substrate layer upon removal of said strippable sacrificial layer].

20. The device according to claim 15, wherein said one or both surfaces exhibit(s) a number ($N_{DT}$) of defects with a vertical amplitude, orthogonal to the film plane, of greater than about 0.25 μm and less than about 30 μm above and/or below the mean surface of no more than 1000 per 31×33 cm area of film surface upon removal of the strippable sacrificial layer, and/or
wherein the improvement ($\Delta\text{-}N_{DT}$) in the parameter ($N_{DT}$), relative to a control PET substrate manufactured without the strippable sacrificial layer, is at least 2, wherein $\Delta\text{-}N_{DT}$ is defined as:

[$N_{DT}$ of said control PET substrate]/[($N_{DT}$) of surface of said PET substrate layer upon removal of said strippable sacrificial layer].

21. The device according to claim 15, wherein said one or both surfaces exhibit(s) a number ($N_{PP}$) of pinch-point peaks with a peak height of greater than about 0.25 μm and less than about 30 μm of no more than 100 per 31×33 cm area of film surface upon removal of the strippable sacrificial layer, and/or wherein the improvement ($\Delta$-$N_{PP}$) in the parameter ($N_{PP}$), relative to a control PET substrate manufactured without the strippable sacrificial layer, is at least 2, wherein $\Delta$-$N_{PP}$ is defined as:

[$N_{PP}$ of said control *PET* substrate]/[($N_{PP}$) of surface of said *PET* substrate layer upon removal of said strippable sacrificial layer].

* * * * *